United States Patent [19]

Heider

[11] 4,165,356

[45] Aug. 21, 1979

[54] METHOD OF FORMING TUBULAR PLASTIC MATERIAL HAVING A FLARE-TOP EDGE USING A BLOW HEAD

[75] Inventor: James E. Heider, Toledo, Ohio

[73] Assignee: Owens-Illinois, Inc., Toledo, Ohio

[21] Appl. No.: 905,713

[22] Filed: May 15, 1978

[51] Int. Cl.² ........................................... B29D 23/04
[52] U.S. Cl. ................................. 264/519; 264/565; 264/566; 264/150; 264/173; 264/209; 264/237; 264/327; 264/339
[58] Field of Search ................... 264/95, 173, 89, 209, 264/237, 150, 339, 327, 519, 514, 560, 565, 566; 425/72, 326.1

[56] References Cited

U.S. PATENT DOCUMENTS

| | | | |
|---|---|---|---|
| 3,538,595 | 11/1970 | Barnes | 264/150 |
| 3,629,389 | 12/1971 | Quackenbush | 264/327 |
| 3,709,290 | 1/1973 | Upmeier | 425/72 R |
| 3,898,028 | 8/1975 | Upmeier | 425/72 R |
| 3,930,768 | 1/1976 | Zimmermann et al. | 425/72 R |
| 3,966,377 | 6/1976 | Upmeier | 425/72 R |
| 4,019,843 | 4/1977 | Zimmermann | 264/95 |
| 4,080,143 | 3/1978 | Upmeier | 425/72 R |

*Primary Examiner*—Jeffery R. Thurlow
*Attorney, Agent, or Firm*—E. J. Holler

[57] ABSTRACT

The method permits selective cooling of tubular plastic material as formed to provide for an exchange of internal cooling air through the central opening of the blow head. Air supply rings having outlet slots facing the tubing, as well as air guide surfaces of small axial length, are provided inside the tubing and spaced from the annular die orifice to serve to support the tubing. The interior cooling air supply rings have axially directed passages for the flow of cooling air while the exterior air supply ring or rings deliver air at higher temperatures to provide a substantial thermal differential between the tube surfaces as formed to provide a flare-top edge upon severance. Also, the method permits forming a foam-film composite of thermoplastic materials by the blown bubble co-extrusion process.

6 Claims, 1 Drawing Figure

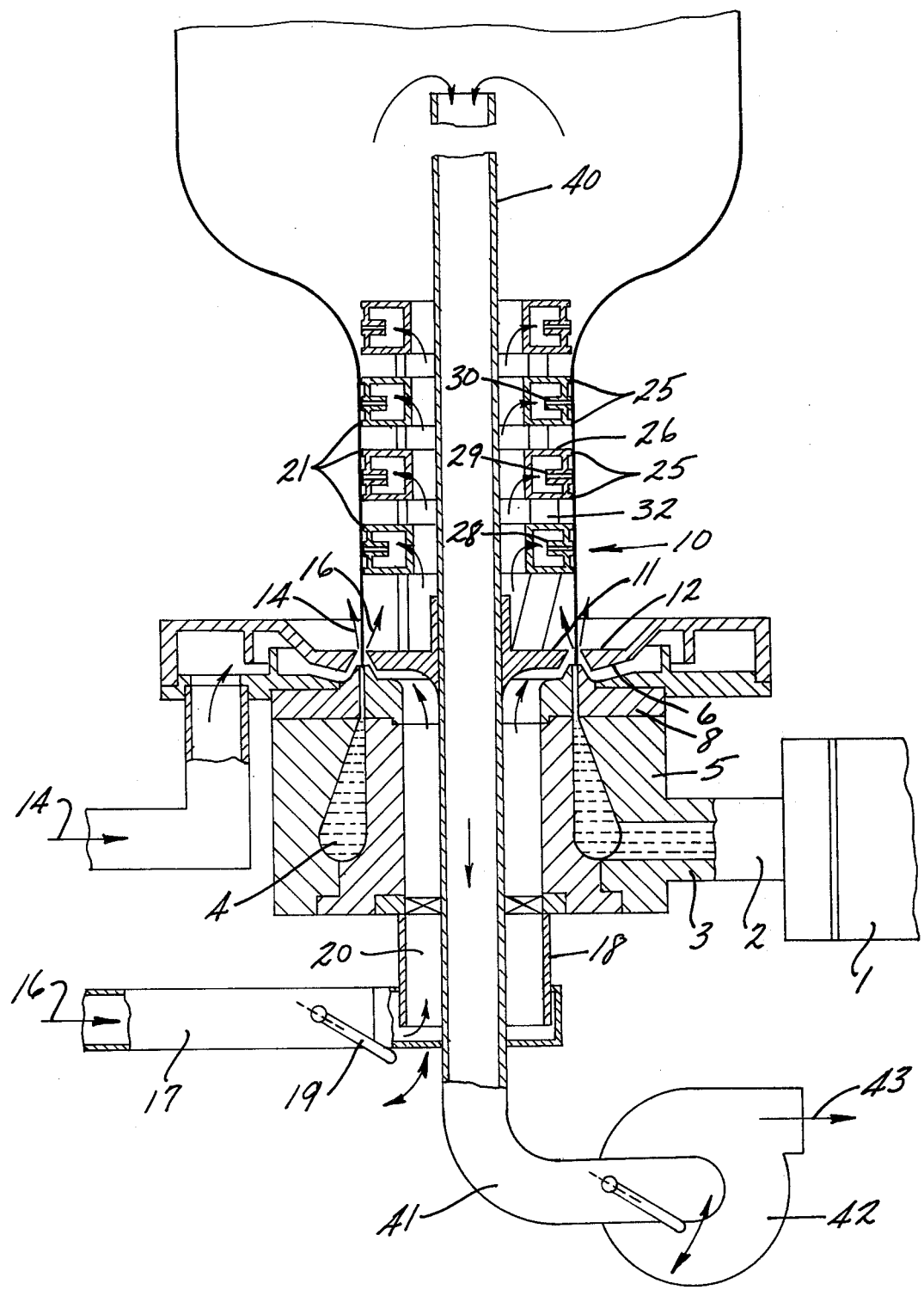

METHOD OF FORMING TUBULAR PLASTIC MATERIAL HAVING A FLARE-TOP EDGE USING A BLOW HEAD

BACKGROUND OF THE INVENTION

This invention relates to a method of forming plastic tubing made by a blow head, which method provides internal cooling air and an exchange of the internal cooling air through a central opening in the blow head. The exterior air ring or rings mounted circumferentially around the tubing as extruded from the blow head deliver warmer air around the exterior surfaces of the tubing to establish a thermal differential for a sufficient time interval between interior and exterior surfaces of the newly-formed tubing during tube formation.

The subject method is particularly important in forming foam-film composite laminates such as from similar or dissimilar thermoplastic materials.

In the manufacture of tubing from synthetic thermoplastic material, it is well known that tubing can be cooled much more advantageously with air than with water. While water cooling in some instances is more effective, its effects are so abrupt as to result in tubing having variable wall thickness and undesirable properties. The main disadvantage of air cooling resides in its low cooling capacity. In the earlier forms of cooling apparatus of the type defined above, the operating methods required that the tubing be taken away from the blow head at relatively slow speed so that only relatively low cooling capacity has been required. In some forms of apparatus, it was not possible to increase the cooling capacity by circulation of the cooling air at a higher rate because such increase in cooling capacity by increasing the air delivery rates resulted in certain disadvantages. These included constriction of the neck of the tube by the air jet effect, or uncontrollable fluttering or vibration of the tubing when still in a plastic state, resulting in non-uniform wall thicknesses.

Increasing the cooling capacity by combining the external cooling of the tubing with simultaneous internal cooling has been achieved by air coolers which are inserted into the blown tubing and are provided with a blower for circulating the enclosed air within the tube to increase the cooling capacity; however, such methods have resulted in the condensation of evaporated constituents of certain molten materials. Various forms of apparatus have been disclosed which provide internal cooling of the tubing with a surge of air through a large central opening of a laterally-fed blow head. Various types of apparatus to achieve internal cooling has been disclosed in U.S. Pat. Nos. 3,898,028, 3,930,768, 3,966,377, 4,019,843, and 3,709,290.

FIELD OF THE INVENTION

It is an object of the present invention to provide for the cooling of plastic tubing in a simplified process which insures good control of the movement of the tubing as formed, enables an increase in cooling capacity, and provides a tubular product which has an inherent characteristic of flared edges when any portion of the tubing is severed. The cooling air is preferably guided over appreciable distances within the tubing, which is in a plastic state as extruded, and a concentric air guiding surface is provided which is substantially parallel to the surface of the tubing. The invention is especially useful in the manufacture of monolayer thermoplastic film, or thin foamed thermoplastic film, or composite laminates of foam and film materials which are co-extruded from a circular co-extrusion die and comprised of similar or dissimilar thermoplastic materials.

DESCRIPTION OF THE PRIOR ART

In cooling apparatus and methods of operation of the kind described in the aforesaid referenced patents, for example, the cooling air supply rings have outlet slots facing the tubing and air guiding surfaces of small axial length which are mounted inside the tubing and spaced from the annular die orifice to serve to support the tubing as formed. The cooling air supply rings define axially-directed, annular passages for the flow of cooling air discharged from the lower cooling air supply rings. The cooling capacity or the rate at which heat can be removed per unit time by the cooling air flow depends on the ratio of the surface area to the mass of the tubing and on the ratio of the mean diameter to the wall thickness of the tubing. If the wall thickness is constant, a sufficient cooling capacity will depend on the mean diameter of the tubing and must increase as the said diameter decreases. Tubing which has been blown and taken away at high speed from blow heads which are small in diameter must be cooled with considerable cooling capacity to provide for the specific cooling capacity which is required to avoid an excessive rise of the freezing limit of the particular material. Cooling apparatus such as disclosed in U.S. Pat. No. 3,898,028 permits delivery of a supply of cooling air at a high rate and high velocity through any desired number of superimposed pairs of air rings without risk of detrimental vibration of the tubing when the same is still in a soft plastic state because the cooling air which is supplied is guided only along short distances between the cylindrical air guiding surfaces and the tubing, and the tubing cannot develop detrimental vibration or fluttering.

The radial supply of cooling air on a plurality of levels to the inside of the blown tubing which is in a soft plastic state is effected by means of an aligned cylindrical set of annular nozzles or orifices. This can be accomplished in a reliable manner and with preservation of the stem-and-bowl shape of the blown tubing, without need for an external support. The blown tubing assumes a stem-and-bowl shape because of its sudden change from a cylindrical initial portion having approximately the diameter with which the tubing is extruded, to the enlarged diameter of the final tubing. This shape is particularly advantageous because the extrusion and stretching of the material result in a longitudinal orientation and it is desired to reduce this longitudinal orientation by a strong and sudden transverse stretching so that the ratio of material strengths in the longitudinal and transverse directions is improved. The function of the interior cooling apparatus is insured although it might be expected that the dynamic blowing pressure which is superimposed on the static internal pressure in the blown tubing could result in an uncontrolled expansion of the externally-unsupported blown tubing in the particular region in which the tubing material is most highly flowable, immediately after it has emerged from the extruder die. However, the tubing retains its cylindrical shape and diameter in that region in which it is still in a soft, plastic state and supplied with cooling blowing air. Flowing at a high velocity, the blowing air does not deform the extruded tubing but supports the same with formation of a cooling air cushion which avoids the tubing physically contacting the interior cooling rings. The air cushion results in good lubrication of the extruded tubing with air so that the tubing may be taken away at a high speed without risk of tearing or developing surface imperfections.

Particularly with tubing having a small diameter, the supporting force of the tubing, even where the same is in a soft, plastic state, is so large that there is no need for external support. The tubing which emerges in a soft plastic state from the blow head has the largest wall thickness at the annular die orifice and this wall thickness continually decreases as the tubing is longitudinally stretched adjacent the cooling rings. The plastic material being in a soft plastic state and subjected to sudden deformation tends to return it to its original shape before the deformation. Thus the tubing tends to constrict and contract towards its center as it moves past the cooling rings. Due to the large initial wall thickness of the tubing and its tendency to contract, the dimensional stability of the just-extruded tubing is so great that even without an external support, the tubing resists the blowing pressure which is superimposed on the internal pressure. Only when stretching of the material has reduced the wall thickness below a certain limit is the resistance of the material to deformation also reduced and the tubing quickly expanded by the internal air pressure until in spite of the lower wall thickness, the solidification of the tubing increases the deformation of the tube to such a degree that the tubing resists the internal air pressure. Thus, the internal cooling apparatus permits excellent stretching of the extruded tubing. The blowing air emerging from the cooling ring orifices produces a cooling air suction which extracts heat at the required rate from the tubing and guides the same smoothly without friction or vibration.

A special advantage of the preferred internal cooling apparatus is due to the absence of means for externally supporting the tubing and the extruded tubing can be moved over the cooling rings in a simple manner so that simplified starting of the process is ensured and long term operation of the process is readily maintained.

For a given velocity of blowing air, the rate at which heat can be removed from the tubing increases as the diameter of the tubing increases and the wall thickness decreases. Thus, the cooling air supply rings are slightly larger in diameter than the annular die orifice.

The cylindrical air-guiding surfaces may be provided at their edges with annular beads which face the tubing. As a result of this profiled shape of that particular surface of the supply rings which faces the tubing, the cooling air is repeatedly caused to flow over a short distance at high speed past the tubing very close to the same so that the tubing is intensely cooled. Thus the annular beads define an annular shape in which a higher pressure builds up which promotes the action of the air cushion to support the tubing.

SUMMARY OF THE INVENTION

The present invention provides a process for the specialized selective cooling of tubular plastic material as formed either in single layer or multi-layer tubular form as extruded and/or co-extruded to permit an exchange of internal cooling air through the central opening of the blow head. Air supply rings having outlet slots facing the tubing, as well as air guide surfaces of small axial length, are provided inside the tubing and spaced from the annular die orifice to serve to support the tubing. The internal cooling air supply rings have a plurality of axially-directed annular passages for the flow of internal cooling air while the exterior air supply ring of rings deliver warmer air at substantially-higher temperatures. Thus, a substantial thermal differential is established in the thermoplastic material between the tube surfaces closely adjacent the extrusion die lip to form tubing having a flare-top edge upon severance.

DESCRIPTION OF THE DRAWINGS

An illustrative embodiment of the invention is set forth more fully hereinafter with reference to the drawings which show a part-sectional, side elevational view of a blow head utilizable in practicing the present invention.

DETAILED DESCRIPTION OF THE INVENTION

Molten material such as high density, foamed polyethylene is delivered from an extruder 1 through a line 2 into an interconnected fitting 3 and then into a circular manifold 4, shown in simplified form, of a blow head 5 having an annular orifice 6 formed by die rings 7 and 8. The molten material is thereby formed into plastic tubing 10 upon its delivery from die rings 7 and 8. The orifice 6 is defined by protruding curved lips 11 and 12 of the juxtaposed die rings 7 and 8. The exterior die lip 12, and the initial portion of the extruded tubing 10 are heated by an air stream 14 emerging from the outer heating ring 15. The interior die lip 11 and an air stream 16 emerging from an inner air guiding ring 17 serve to cool the interior portions of emerging tubing and die lip 11. Cooling air 16 is delivered internally from a blower (not shown) and is conducted through interconnecting pipes 17 and 18 to the interior cooling ring through a valve 19 and an annular passage 20 to the internal rings 21 for guiding the internal cooling air.

A plurality of vertically-mounted, spaced-apart inner air-guiding rings 21 are provided inside the tubing closely adjacent and above the blow head and each is provided with air guiding lips 25. These air guiding rings 21 are carried by the annular ring 26 and connected thereto by spacers 32. Cooling air from the air supply passage 20 is supplied to the interior rings 21 through the connecting pipes 28, 29 and 30. A plurality of connecting pipes is spaced around the periphery to insure a uniform supply of air to the air rings. The narrow air outlet gaps particularly between the die lip 9 and the air guiding ring 17 result in a distribution of air to the various air rings. The connecting pipes 28, 29 and 30 decrease in cross-section in the direction of flow to insure uniform velocity of air flow. Cylindrical air guiding surfaces of small axial length are provided between the lips 25 and 26 to form narrow air outlet gaps facing the tubing.

The blowing air discharged by the several internal cooling air supply rings is guided to the annular spaces between the inner wall of the upper cooling air-guiding rings of the central tube 40 in the inflated portion of the tubing to the tube end 41 of the suction tube which is interconnected to an evacuating blower 42.

The air passages extending through the blow head 5 are preferably provided with a heat-insulating layer and the air guiding rings 18 are similarly insulated (not shown) in order to prevent heating of the incoming cooling air by the outflowing warmer air.

The hot air having a temperature of at least 25° C. higher than the internal cooling air is delivered forcefully against the exterior surface of the tubing. The hot air can be delivered from one or more annular nozzles or orifices mounted closely-adjacent the extruded tubing and just above the die lips. The tubing may consist of single layer or multi-layer film as formed by extrusion or co-extrusion.

The cooling system relies on the exchange or air inside the bubble to increase cooling and product through-put. Normally slightly chilled or room temperature air is blown into the bubble and hotter air is blown up and around the outside of the bubble. An air volume equal in volume to that blown into the bubble is pulled out using a suction blower. The air in and air out are balanced resulting in no change in the bubble diameter.

By using substantially-higher temperature air on the outside of the bubble than on the inside of the bubble, selective cooling is provided in the desired sequence and high output is achieved. When the temperature of the air supplied inside the bubble is significantly colder than the outside air, the inner surface of the film or foamed film will fast chill in a certain distinctive crystalline structure. As the outside surface of the film or foamed film more slowly cools, the crystalline structure on the outer surface will grow resulting in a net shrinkage of the outside surface as compared with the inner surface. The differential sets up a stress which curls the film outwardly on severance of the two one-ply sheets of the collapsed tubing. The amount of curl can be controlled by controlling the temperature of the two air flows.

The extruded film as formed into tubing has extremely uniform wall thickness. The tubing does not physically contact a cylindrical forming drum or the like during its formation. The cooling air on the interior forms skin layers on the interior surface of the tubing. The warmer air of the exterior forms altogether different surface characteristics from the interior. The tubing when severed in any area exhibits the inherent characteristic of flaring open so that ready access to the tube interior can be achieved. Especially when the tubing is made into bags along sealed and perforated transverse lines at spaced intervals along the roll of tubing is the feature of flaring-top opening particularly valuable. When the tubing is cleanly severed, the edges have a positive tendency to separate to provide easy opening. Thus the flattened tubing lying in face-to-face two-ply relation tends to quickly and immediately separate on opening due to the interior and exterior surfaces of the plies having significantly different physical characteristics.

As stated hereinabove, the subject invention is advantageous in forming foam-film composite laminates. Polyethylene powered resin and a blowing agent are extruded through a conventional extruder to a circular co-extrusion die. Another extruder discharges molten polyethylene (without a foaming agent) (not shown) into this same co-extrusion die. The foaming agent foams upon co-extrusion to form the foam/film laminate which is blown by the bubble process, cooled by the internal cooling air, and heated by the external heating air, and then formed into tubing which is then flattened into two-ply sheets.

The process provides means for introducing chilled cooling air internally of the bubble and heated heating air externally of the bubble and at a high production rate. In this invention, the co-extrusion of a foam/film laminate is of special interest while the prior art concerns the extrusion of single films and certain film/film laminates.

In the subject process, a method is provided to economically manufacture flare-top tubing using the blown-film technique. At present, the blown-film technique results in producing tubing which is difficult to separate, that is, the sides of the tubing stick together appearing like one sheet. The use of this invention provides tubing which has a built-in curl making it easy to open. Tubing with an outward curl can be made by an expensive co-extrusion process or through the use of an internal mandrel. The co-extrusion process is more expensive. Using the high-speed blown film technique in combination with the present process provides tubing having improved physical characteristics for easy opening.

A wide variety of thermoplastic materials is suitable for practicing the present invention such as high, medium and low density polyethylene, polyproplene, polystyrene, polyvinyl chloride and copolymers of carboxylic acid containing monomers with ethylene, as well as many others.

Various other modifications may be resorted to within the spirit and scope of the appended claims.

I claim:

1. In a method of forming extruded tubular thermoplastic film to create a permanent inherent flaring characteristic of the severed edges of the tubular film when flattened and lying in face-to-face two-ply relation, wherein a series of internal annular nozzles is employed to cool the film internal surface with a gaseous medium and form continuous skin layers thereon and wherein the film during formation by streatching is maintained out-of-contact with said internal annular nozzles, the improvement which comprises the steps of directing a plurality of radial streams of cooling gaseous medium from said series of internal annular nozzles forcefully against the interior surface of the extruded tubular film as formed closely adjacent the melt issuing extruder, controlling the removal of the internal cooling gaseous medium from the interior of the extruded tubular film and through the extruder to thereby control the internal pressure and precise dimensions of the extruded tubular film as formed, directing one or more radial streams of heated gaseous medium forcefully against the exterior surface of the extruded tubular film as formed closely adjacent the melt issuing extruder, the cooling and heated gaseous mediums being juxtaposed at least in part and simultaneously applied in facing relation to create a substantial temperature differential between the interior and exterior surfaces of the extruded tubular film as formed to thereby establish different physical characteristics in said surfaces and a permanent flaring tendency at its edges when flattened and subsequently severed.

2. The method in accordance with claim 1, wherein cold air is forcefully impinged onto the interior surface of the extruded tube as formed and simultaneously warm air is forcefully impinged onto the juxtaposed exterior surface of the extruded tube as formed to provide the flare-top feature of the severed edge of said tube.

3. The method in accordance with claim 1, wherein cold air is forcefully impinged from a plurality of annular sources against the interior surface of the extruded tube as formed and simultaneously hot air is forcefully impinged from at least one annular source against the exterior surface of the extruded tube as formed for a sufficient time interval to provide a flare-top edge of the tube wherever severed.

4. The method in accordance with claim 1, wherein said cold interior air and hot exterior air are both emitted from diametrically-opposed annular orifices mounted closely adjacent the point of tube extrusion.

5. The method in accordance with claim 1, wherein the cooling gaseous medium is emitted from a plurality of aligned annular orifices disposed within the interior of said extruded tubular film and said annular layer of warmer gaseous medium is emitted from a single annular orifice, a temperature differential of at least 25° C. being created between interior and exterior surfaces of said tube as formed.

6. The method in accordance with claim 1, wherein said extruded tubular thermoplastic film consists essentially of foam-film composite laminate of similar or dissimilar thermoplastic materials.

* * * * *